Aug. 6, 1963     V. DUQUESNE     3,100,008
AXIALLY EXTENDING TOOL MOUNTING COLUMN FOR DISC WHEELS
Filed Aug. 11, 1960
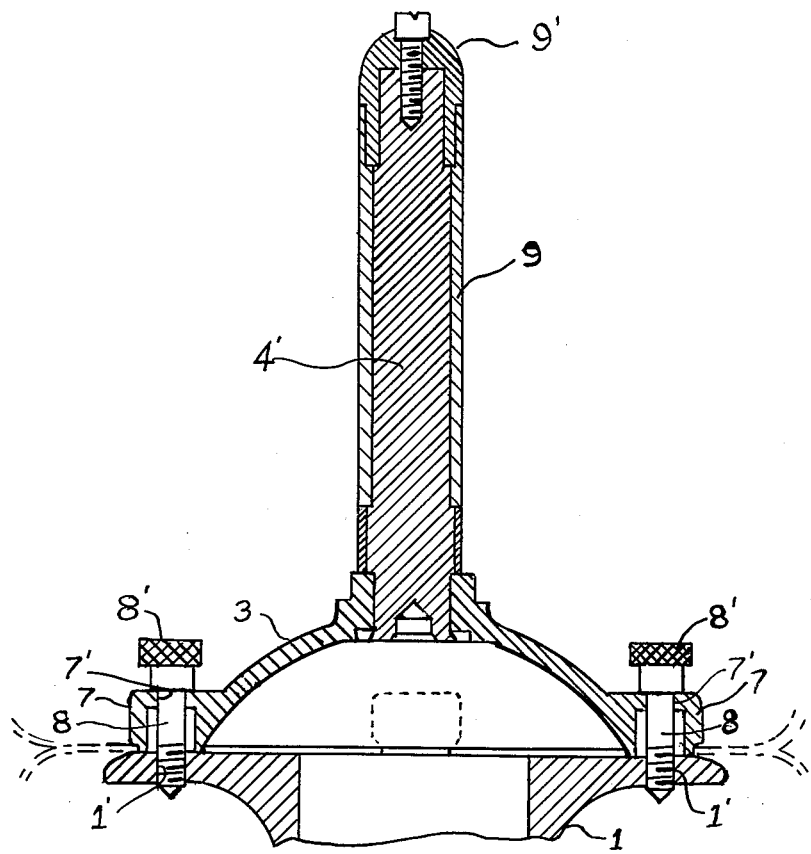
INVENTOR
*VICTOR DUQUESNE*
BY *Linton and Linton*
ATTORNEYS

United States Patent Office 3,100,008
Patented Aug. 6, 1963

3,100,008
AXIALLY EXTENDING TOOL MOUNTING COLUMN FOR DISC WHEELS
Victor Duquesne, 42–44 Rue Quellin, Antwerp, Belgium
Filed Aug. 11, 1960, Ser. No. 49,079
1 Claim. (Cl. 144—288)

This application is a continuation-in-part of my copending application Serial No. 834,442, filed August 18, 1959, which matured into Patent No. 3,063,484.

The present invention relates to apparatus used for mounting and removing tires of motor vehicle wheels.

In such known apparatus, the wheel body is centered and locked upon a supporting plate, which bears a shaft of convenient section adapted to traverse the central opening of appreciable diameter of the wheel disc. This shaft has to resist the considerable forces from tools operating upon the tire. Applicant is owner of patents relating to such apparatus, namely United States Patents Nos. 2,845,969 and 2,916,065.

Some automobile works, such as those manufacturing the cars of the trademarks "Citroën," "Peugeot," "Fiat," "Renault," "D.A.F.," omit the central opening of large diameter in the wheel disc and provide in such discs only a central perforation of small diameter. Such very small perforations prevent the passage of a shaft sufficiently strong to resist the forces of the tools used thereon for mounting or removing the tires. Other types of disc wheels have a plain center without any central perforation and present only a number of holes arranged equidistant around the center of the wheel disc. The construction of this type of wheel also prevents the central passage of a shaft of sufficient dimension.

The omission of a central opening of an adequate diameter in the disc of such wheel does not permit the erecting of said sufficiently strong shaft upon the supporting plate upon which it is generally locked to the wheel to be worked upon.

It is however indispensable to have a central shaft of sufficient strength to resist the forces of tools used thereon for mounting or removing tires.

The present invention has for an object the providing of a device for erecting above the wheel discs of the aforementioned types, within the axis and in a rigid manner, a strong shaft, which device includes a bell-shaped instrument for contacting the wheel disc concentrically to its axis, and means for operating a tractive effort upon the bell-shaped instrument for pressing and stabilizing the shaft and said instrument upon the disc.

For mounting or removing a tire of a wheel, the latter will be advantageously fixed upon a sustaining plate by well known means.

The drawing shows a longitudinal sectional view of the present device.

The device is more particularly adapted for operating upon wheels of which the disc presents holes arranged equidistant and diametrally opposed with respect to the wheel center. The bell-shaped member 3 is a part of the shaft 4'. Said member has two lugs 7 projecting laterally and being diametrally opposed. The lugs 7 have passages 7' corresponding to the tapped holes 1' provided into the supporting plate 1. Screws 8 having convenient heads 8' traverse the lugs 7 and screw into the tapped holes of the plate 1 so as to secure the locking of the wheel body B. The shaft 4' normally erected upon the bell-shaped member 3 is surrounded by a sleeve 9 which is freely rotatable and held between a shoulder of the shaft 4' and a shoulder of a cap 9' fixed at the top end of the shaft 4'.

It is useful to have the circular edge of the bell-shaped member of the largest possible diameter with relation to the conformation of the wheel disc, in view of forming an extended triangulation between the shaft and the said edge. Such arrangement secures a perfect stability of the shaft, on which the freely rotatable sleeve will support the tools operating upon the tires.

I claim:

A device for mounting an axially extending tool mounting column upon disc wheels having only bolt holes arranged equidistant apart around the center of the wheel disc comprising a supporting plate supporting the wheel disc and having tapped holes arranged to register with the bolt holes of the wheel disc, a shaft, a bell-shaped member having its convex side axially fixed at the end of said shaft and having its circular edge in a plane at right angles to the axis of said shaft, laterally projecting lugs at the edge of said bell shaped member, the bottom side of said lugs being co-planar with said circular edge, said lugs having holes extending therethrough and located to register with the holes of the wheel disc and headed screws traversing the holes of said lugs for engaging the tapped holes of said supporting plate, the shanks of said screws being of uniform diameter throughout their length and freely passing through the holes of the lugs and the wheel disc whereby to provide a full and continuous contact of said circular edge with the wheel disc.

References Cited in the file of this patent

UNITED STATES PATENTS

| | | |
|---|---|---|
| 1,017,801 | Rice | Feb. 20, 1912 |
| 1,352,722 | Caldwell | Sept. 14, 1920 |
| 1,658,451 | Long | Feb. 7, 1928 |
| 1,936,984 | Listebarger | Nov. 28, 1933 |
| 1,964,470 | King | June 26, 1934 |
| 2,034,819 | Maulis | Mar. 24, 1936 |
| 2,845,969 | Duquesne | Aug. 5, 1958 |

FOREIGN PATENTS

| | | |
|---|---|---|
| 551,785 | Belgium | Oct. 31, 1956 |